Sept. 2, 1924.
R. A. BROCKELSBY
FRICTION DRAFT RIGGING
Filed Feb. 18, 1922    3 Sheets-Sheet 1
1,506,811
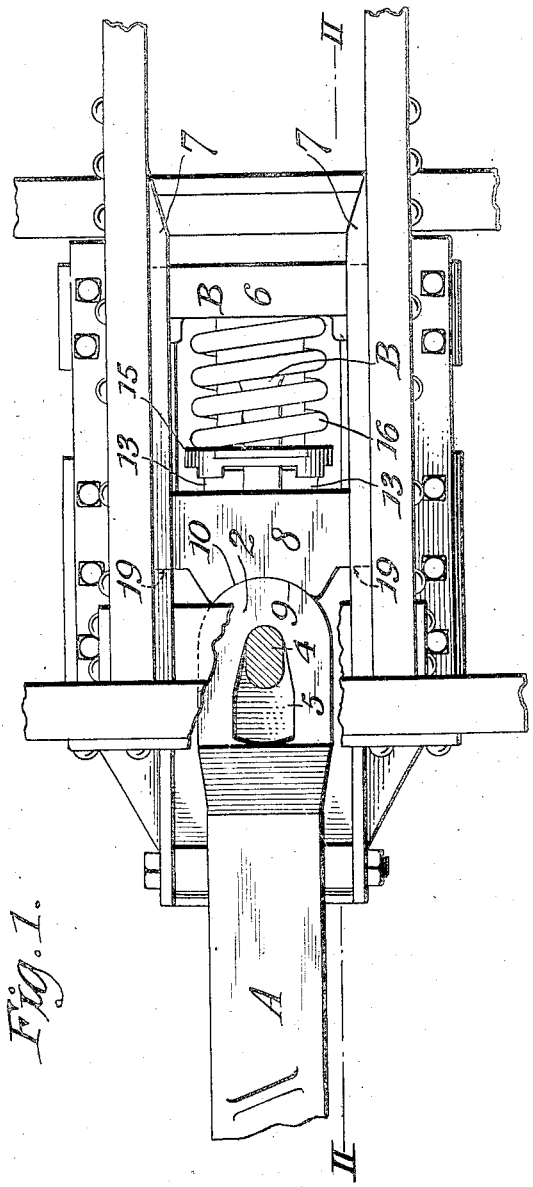
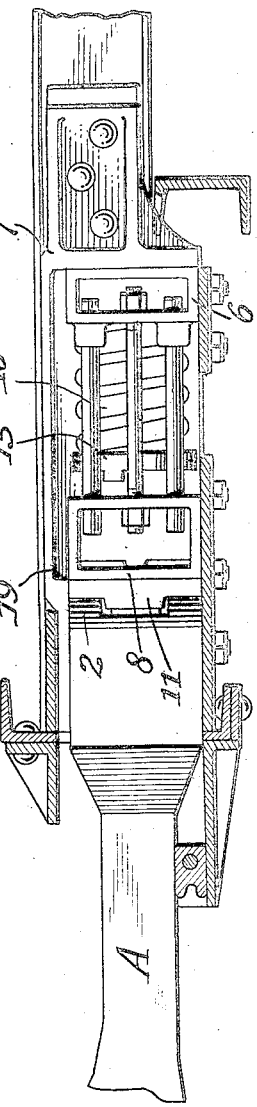
INVENTOR
Ralph A Brockelsby
BY
Clarence L Kerr
ATTORNEY

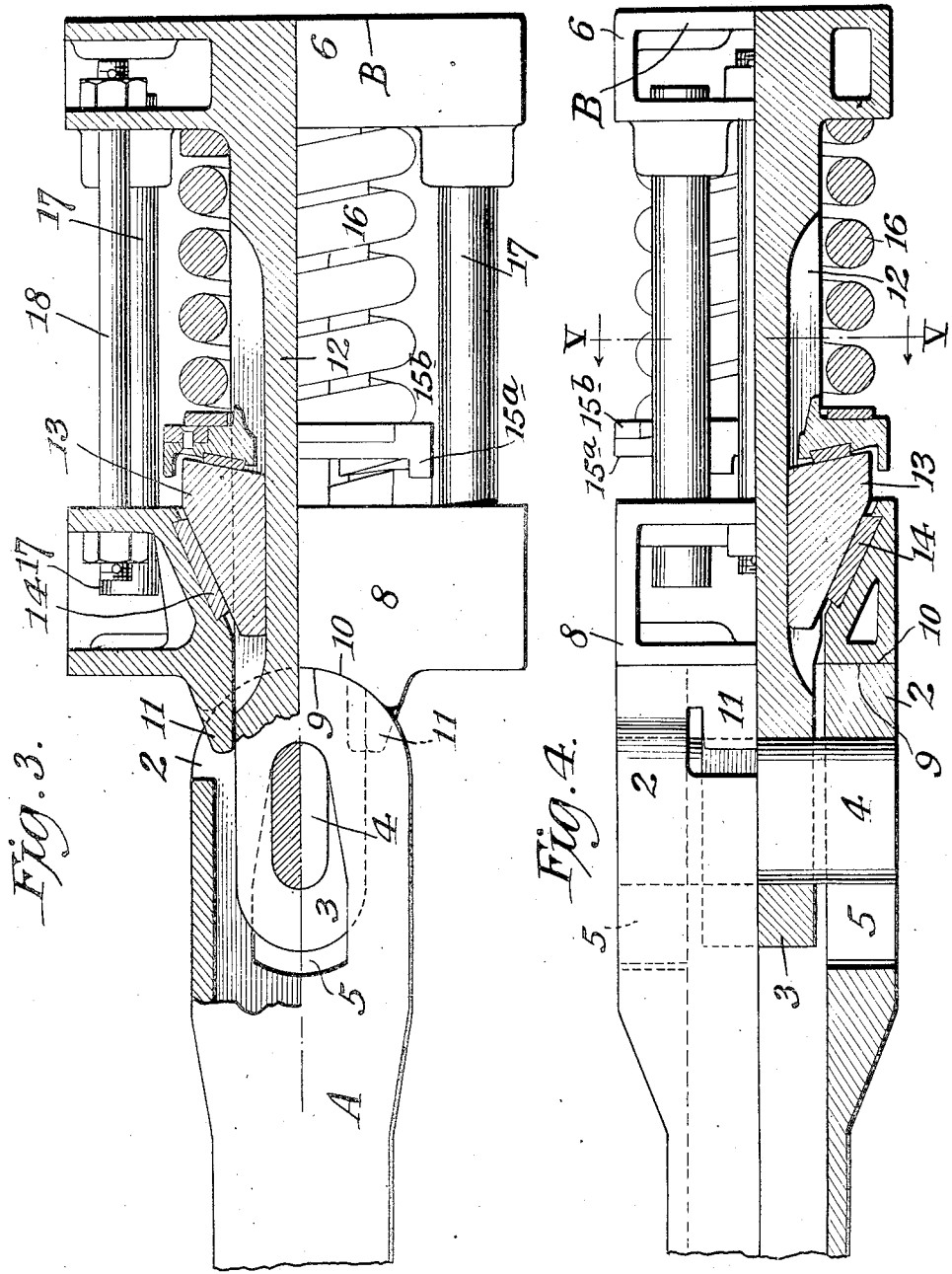

Sept. 2, 1924.
R. A. BROCKELSBY
1,506,811
FRICTION DRAFT RIGGING
Filed Feb. 18, 1922    3 Sheets-Sheet 3
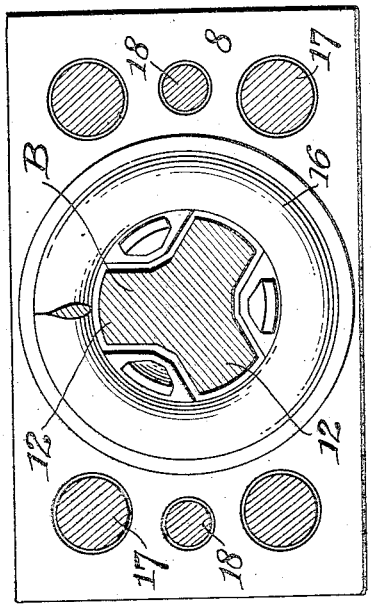
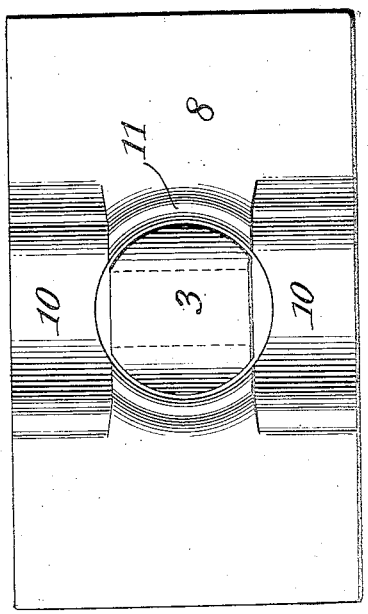
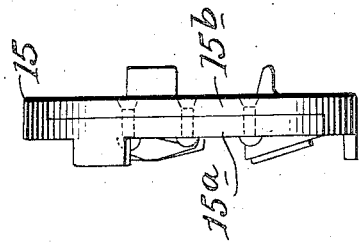
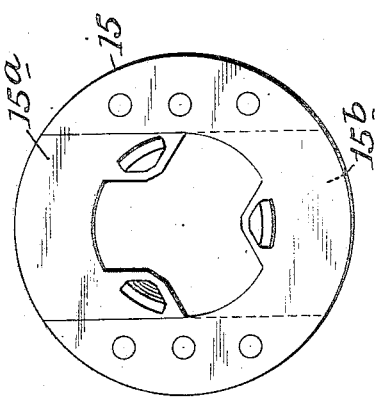
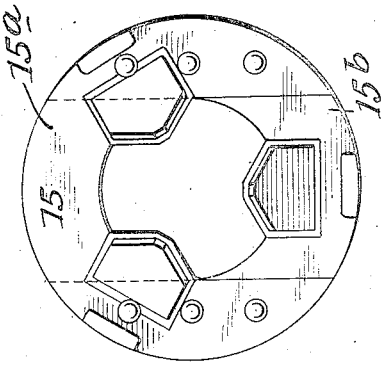
INVENTOR
Ralph A. Brockelsby
BY
Clarence K. Kerr
ATTORNEY Patented Sept. 2, 1924.

1,506,811

UNITED STATES PATENT OFFICE.

RALPH A. BROCKELSBY, OF CLEVELAND, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

FRICTION DRAFT RIGGING.

Application filed February 18, 1922. Serial No. 537,371.

*To all whom it may concern:*

Be it known that I, RALPH A. BROCKELSBY, a citizen of the United States, residing at Cleveland, Cuyahoga County, Ohio, have invented new and useful Improvements in Friction Draft Rigging, of which the following is a specification, reference being had to the accompanying drawings, in which—

Fig. 1 is a plan showing the application of my invention to the underframing of a car; Fig. 2 is a section on lines II—II of Fig. 1; Fig. 3 is a detail plan of the mechanism partly in section; Fig. 4 is an elevation of a detail of the mechanism partly in section; Fig. 5 is a section on lines V—V of Fig. 4; Fig. 6 is an elevation of the forward side of the front follower; Figs. 7 and 8 are elevations, respectively, of the front and rear sides of the intermediate follower; and Fig. 9 is a side elevation thereof.

My invention relates to friction draft rigging for tail bolt couplers and comprises the use of a tail bolt in the form of a central friction member of the draft rigging, upon which are mounted friction shoes, wedging means and a spring, the forward end of which is designed for attachment to the coupler butt and the rear end of which is preferably enlarged to form a broad, flat base of resistance. This construction is particularly adapted for use in cars in which there is not room for a yoke or draft links of the ordinary character. My invention also comprises the various features which I shall hereinafter describe and claim.

Referring to the drawings, A indicates the coupler, which at its rear end terminates in a pair of parallel, horizontal extensions 2 providing a space between them for the reception of a forward end 3 of the tail bolt,— which is in the form of a central friction member B. The forward end 3 of the central friction member B and the rearward extension 2 of the coupler A are apertured for the reception of a vertically disposed key or pin 4. The apertures 5 in the rearward extensions 2 of the coupler are elongated and are made of greater width at their forward ends to provide for movement of the coupler relative to the pin 4 and the central friction member in buff and in lateral angling.

The central friction member B has an enlarged base 6, preferably made integral, which serves as the rear follower and engages rear draft sill stops 7. Surrounding the forward end of the central friction member and immediately to the rear of its connection with the coupler is a follower wedge 8, which is centrally apertured and through which the forward end 3 of the central friction member B extends. The extensions 2 of the coupler shank have arc-shaped rear ends 9, and the follower wedge has similarly rounded seats 10 above and below its central aperture, against which the rounded ends 9 of the coupler extensions 2 will bear in buffing. The follower wedge 8 also has guide lugs 11 which extend forwardly at either side of the forward end 3 of the central friction member so as to guide the central member when the coupler is pulling at an angle. The central friction member B preferably has outwardly radiating arms 12 forming re-entrant angles therebetween. In each re-entrant angle a friction shoe 13 is seated, upon which bear corresponding wedging faces 14 of the follower 8. To the rear of the friction shoes 13 is a segmental seat or intermediate two-part follower 15, the forward face of which engages the shoes 13 and the rear face of which is engaged by a spring 16, which at its rear end bears against the enlarged base 6 of the central friction member. The segmental seat or intermediate follower 15 is made in two U-shaped parts 15ª, 15ᵇ, and, as is shown in Figs. 3, 4 and 7, is of a smaller internal diameter than the forward end 3 of the central friction member, which is enlarged and reinforced around the aperture for the pin 4. Seated in openings in the follower wedge 8 and base 6 are the buffing columns 17, which prevent further compression of the gear after the safe limit of compression has been reached, and the retaining rods 18 by which the gear is held together and prevented from separating either during shipping or while in use.

In assembling the gear the parts are threaded over the central friction member from the forward end, and the two parts 15ª, 15ᵇ which have an overlapping engagement with each other, are riveted together, as is best shown in Figs. 3 and 4, after being put in place about the central friction member. When the gear has been assembled, the forward end 3 of the central friction member is attached to the rearward extensions of the coupler by passing a key 4 through the apertures 5 in the coupler extensions and in the forward end 3 of the central friction member B.

In buffing, the arc-shaped rear ends 9 of the coupler shank bear against the seats 10 of the follower wedge, the rear follower 6 is held against rearward movement by the rear draft lugs 7, and the rearward movement of the wedge 8 under impulse from the coupler is resisted by the frictional engagement of the shoes against the central friction member. In draft, the coupler shank A pulls the central friction member B forwardly, through its key connection with that member, and the pressure is transmitted through the base 6 to the spring, the segmental seat 15$^a$, 15$^b$, and thence through the friction shoes to the central friction member, as the wedge 8 is held against forward movement by the front draft sill stops 19. Release of the frictional parts is effected by the compression spring after the pressure of buffing or draft abates.

My invention is particularly suitable for application to cars in which room is not afforded to pass a yoke around a draft gear of standard dimensions or where there is no room for making connections at the sides of the gear. This construction provides a gear of very rugged type, which is capable of extremely heavy service, since the friction mechanism is designed to withstand extremely heavy pressures.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed. It is also to be understood that in using the term "wedge follower" in the appended claims I do not intend to define the member referred to merely as "a follower," but rather as a member having wedging surfaces.

What I claim is:

1. A friction draft gear comprising a central friction member having a forward projection slotted for connection with apertured rearwardly extending arms of a coupler, the projection and arms being connected by a transversely extending key, said central friction member having a broad, flat base of resistance and friction shoes arranged in re-entrant angles of said central friction member, spring mechanism between said shoes and the said base and a follower wedge threaded over the forward end of said central friction member engaging said shoes and arranged to take up the buffing stresses from the rear end of the coupler.

2. A friction draft gear comprising a central friction member having its forward end connected to the rear end of a coupler by a slot and projection engagement and a transversely extending key, the central friction member having assembled upon it friction shoes, a spring between said shoes and a portion of the central friction member and arranged to resist the travel of the shoes along said member and a follower wedge, said wedge being arranged to transmit buffing stresses directly from coupler to the frictional elements.

3. A friction draft gear comprising a central friction member having its forward end connected to the rear end of a coupler, said member having in its sides re-entrant angles, friction shoes arranged in said angles, a wedge follower engaging said shoes and having a guiding bearing upon the central friction member when the coupler is under draft, and a compression spring between the rear end of the member and the shoes.

4. A friction draft gear comprising a central friction member connected to the rear end of a coupler, said member having longitudinally extending friction faces and enlargements at its forward and rear ends, friction shoes engaging said friction faces, a wedge follower and an intermediate follower surrounding said friction member and engaging said shoes, said intermediate follower having an aperture therethrough of a size insufficient to pass over the forward end of said friction member, and spring mechanism having bearings on the intermediate member and on the enlargement at the rear end of the central member.

5. A friction draft gear comprising a central friction member having its forward end arranged to be connected to the rear end of a coupler, the said member having enlargements at its forward and rear ends and longitudinally extending friction faces, said friction faces being engaged by friction shoes, a wedge follower bearing upon said friction shoes capable of being threaded over the forward end of the friction member, and a two-part intermediate follower also bearing on the friction shoes, the said intermediate follower being incapable of being threaded over the forward end of said member, and spring mechanism having bearings on the intermediate member and on the enlargement at the rear end of the central member.

6. A friction draft gear comprising a central friction member, friction shoes mounted upon said central friction member, a wedge follower for forcing said shoes into frictional engagement with said central friction member, and a spring between said friction shoes and central friction member, the central friction member at its forward end being flexibly connected to a coupler shank and being guided laterally by said wedge follower.

7. A friction draft gear comprising a central friction member, friction shoes mounted upon said central friction member, a wedge follower for forcing said shoes into frictional engagement with said central friction member, and a spring between said friction shoes and central friction member, the central friction member having an extension projecting through said wedge follower and having a flexible pulling connection with a coupler shank, said connection permitting relative movement of coupler and central member in buffing.

RALPH A. BROCKELSBY.